US008650585B2

(12) United States Patent
Arima

(10) Patent No.: US 8,650,585 B2
(45) Date of Patent: Feb. 11, 2014

(54) TRANSACTION MANAGEMENT FOR RACING ENTERTAINMENT

(76) Inventor: Takayuki Arima, Rancho Palos Verdes, CA (US)

( * ) Notice: Subject to any disclaimer, the term of this patent is extended or adjusted under 35 U.S.C. 154(b) by 141 days.

(21) Appl. No.: 13/353,221

(22) Filed: Jan. 18, 2012

(65) Prior Publication Data
US 2013/0185743 A1 Jul. 18, 2013

(51) Int. Cl.
H04N 7/16 (2011.01)
H04N 7/18 (2006.01)
H04H 40/00 (2008.01)
A63F 9/24 (2006.01)
A63F 13/00 (2006.01)
G06F 17/00 (2006.01)
G06F 19/00 (2011.01)

(52) U.S. Cl.
USPC ............. 725/1; 348/157; 348/159; 455/3.06; 463/16; 463/25

(58) Field of Classification Search
USPC ............................................. 725/1; 348/157
See application file for complete search history.

(56) References Cited

U.S. PATENT DOCUMENTS

| 5,830,068 | A | 11/1998 | Brenner et al. |
| 6,726,567 | B1* | 4/2004 | Khosla ............................ 463/42 |
| 7,379,886 | B1 | 5/2008 | Zaring et al. |
| 2002/0090217 | A1* | 7/2002 | Limor et al. .................. 396/429 |
| 2003/0142829 | A1 | 7/2003 | Avigni |
| 2003/0153374 | A1 | 8/2003 | Gilmore |
| 2007/0021055 | A1* | 1/2007 | Arseneau et al. ............. 455/3.06 |
| 2008/0207310 | A1* | 8/2008 | Mindes ........................... 463/25 |
| 2009/0053974 | A1 | 2/2009 | Domm et al. |
| 2009/0093290 | A1* | 4/2009 | Lutnick et al. .................. 463/16 |
| 2009/0239598 | A1 | 9/2009 | Abe |
| 2009/0312854 | A1* | 12/2009 | Jung et al. ....................... 700/90 |
| 2010/0171834 | A1* | 7/2010 | Blumenfeld .................. 348/159 |
| 2013/0182116 | A1* | 7/2013 | Arima .......................... 348/157 |

FOREIGN PATENT DOCUMENTS

EP 1452213 A1 9/2004

OTHER PUBLICATIONS http://www.liquidimageco.com/products/.
http://www.engadget.com/2012/03/16/sky-sports-for-ipad-2-0-launches-with-live-tv-streaming-f1-race/.
Screen Print of http://www.liquidimageco.com.
Screen Print of http://www.engadget.com/2012/03/16/sky-sports-for-ipad-2-0-launches-with-live-tv-streaming-f1-race/.
International Search Report and Written Opinion on PCT/US2012/030521.

* cited by examiner

Primary Examiner — Christopher Kelley
Assistant Examiner — Hee-Yong Kim
(74) Attorney, Agent, or Firm — LambentIP

(57) ABSTRACT

A system and method are provided to perform operations for racing entertainment, including providing each of multiple racers with devices to capture images and sounds as perceived by the racer during a race, obtaining information pertaining to each of multiple users such as account information and selection of a racer whom the user wants to get connection with, managing transactions, processing the images and sounds, and transmitting the processed images and sounds from the racer to a client terminal of the user who selected the racer.

17 Claims, 8 Drawing Sheets

TRANSACTION MANAGEMENT FOR RACING ENTERTAINMENT

BACKGROUND

With the advancement of TV games, video games and other digital and mobile entertainment technologies, people are more and more opted for staying indoors. The number of spectators who go out to a stadium for sports games or races is declining, thereby shaking the economy of related industries. In particular, the racing industry has been hit hard since racing excitements can be easily and virtually experienced by playing a racing game on a cellular phone, a smart phone, iPad®, a tablet and other mobile devices or a TV system, which is readily available to a user. However, these pre-programmed games tend to have preset scenarios limiting the variations of excitements that the user can enjoy, thereby eventually boring the user.

Accordingly, the present invention is directed to a new type of entertainment business that enables users to enjoy the vivid images and sounds as perceived during a race by a racer of his/her choice. Such entertainment can provide the user with the realistic experience filled with real-time, on-site and unforeseen excitements, thereby expected to open up a new entertainment paradigm. "Races" in this document refer to competitions on speed involving motorcycles, cars, bicycles, boats, aircraft, horses, skis, skates, skateboards, sleighs, wheelchairs, yachts, and other vehicles or animals.

DETAILED DESCRIPTION

Figure 1:
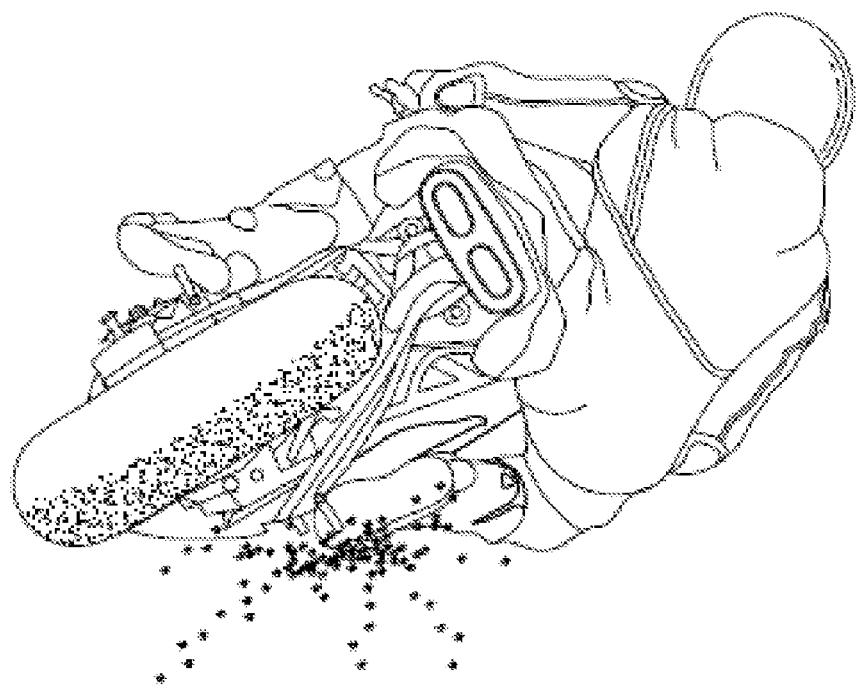
FIG. 1 illustrates an example of a view perceived by a racer following another racer running ahead of him during a motorcycle racing.

FIG. 1 illustrates an example of a view perceived by a racer following another racer running ahead of him during a motorcycle racing. The excitement among the race participants is apparent owing to the dynamics of the real-time views and sounds, such as the way the preceding racer maneuvers his motorcycle, surrounding scenes passing by with a high speed, sparks created, roaring sound, etc. Such excitements of a real-time racing cannot be felt by mere spectators. In a conventional broadcasting system, one or more cameras are provided at fixed locations outside the race track, providing views and sounds as perceived by a spectator. Enabling users to receive the vivid images and sounds as perceived by a racer can provide the exciting racing experience, hence a new type of entertainment. Such entertainment may be realized by using a system that is configured to capture images and sounds as perceived by a racer, and transmit them to a user so that the user can virtually experience the race as if he/she is participating in the race.

Figure 2:
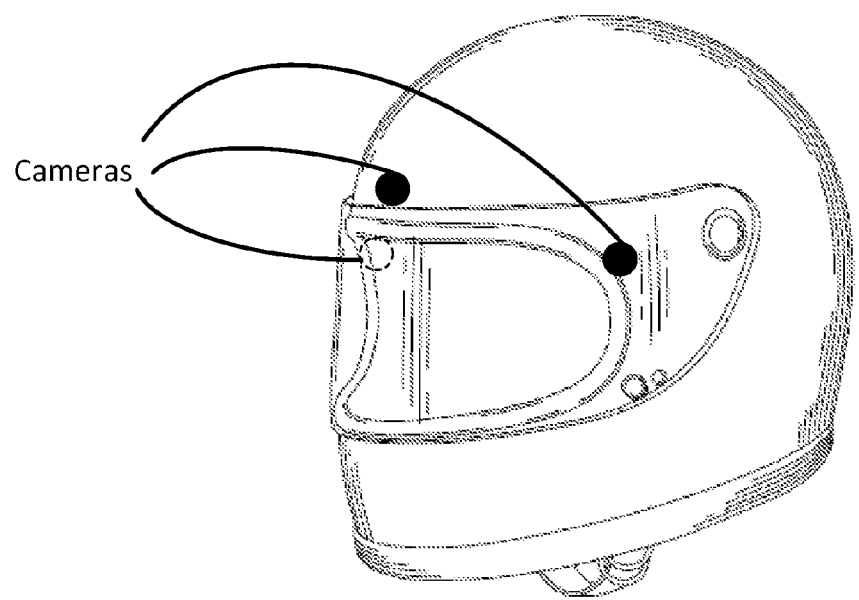
FIG. 2 illustrates an example of the positions of cameras attached to a helmet.

The images perceived by a racer can be captured by one or more cameras provided in the proximity of his/her eyes. FIG. 2 illustrates an example of the positions of the cameras. In this example, three cameras are attached to the racer's helmet: one near the forehead and two near the both sides of the eyes. Two or more cameras can capture the images as seen from two or more perspectives, respectively, which can be processed by using a suitable image processing technique for the viewer to experience the 3D effect. Similarly, one or more microphones may be attached to the helmet to capture the sounds. For example, two separate microphones may be placed near both the ears of the racer, to capture the sounds from two audible perspectives, respectively, which can be processed by using a suitable sound processing technique for the viewer to experience the stereophonic effect. In another example, a microphone may be placed at the back side of the helmet so that the sound from behind can be clearly captured to sense what's going on behind him/her in the race. This gives an interesting experience for the user connected to the racer running first, since the user can sense if another racer is catching up or the first racer is taking a big lead by listening to the sounds from behind. In yet another example, a device including both a camera and a microphone may be used. For example, such two devices may be placed on the racer's temples to capture both the images and sounds at locations as close as possible to the eyes and ears at the same time.

Figure 3:
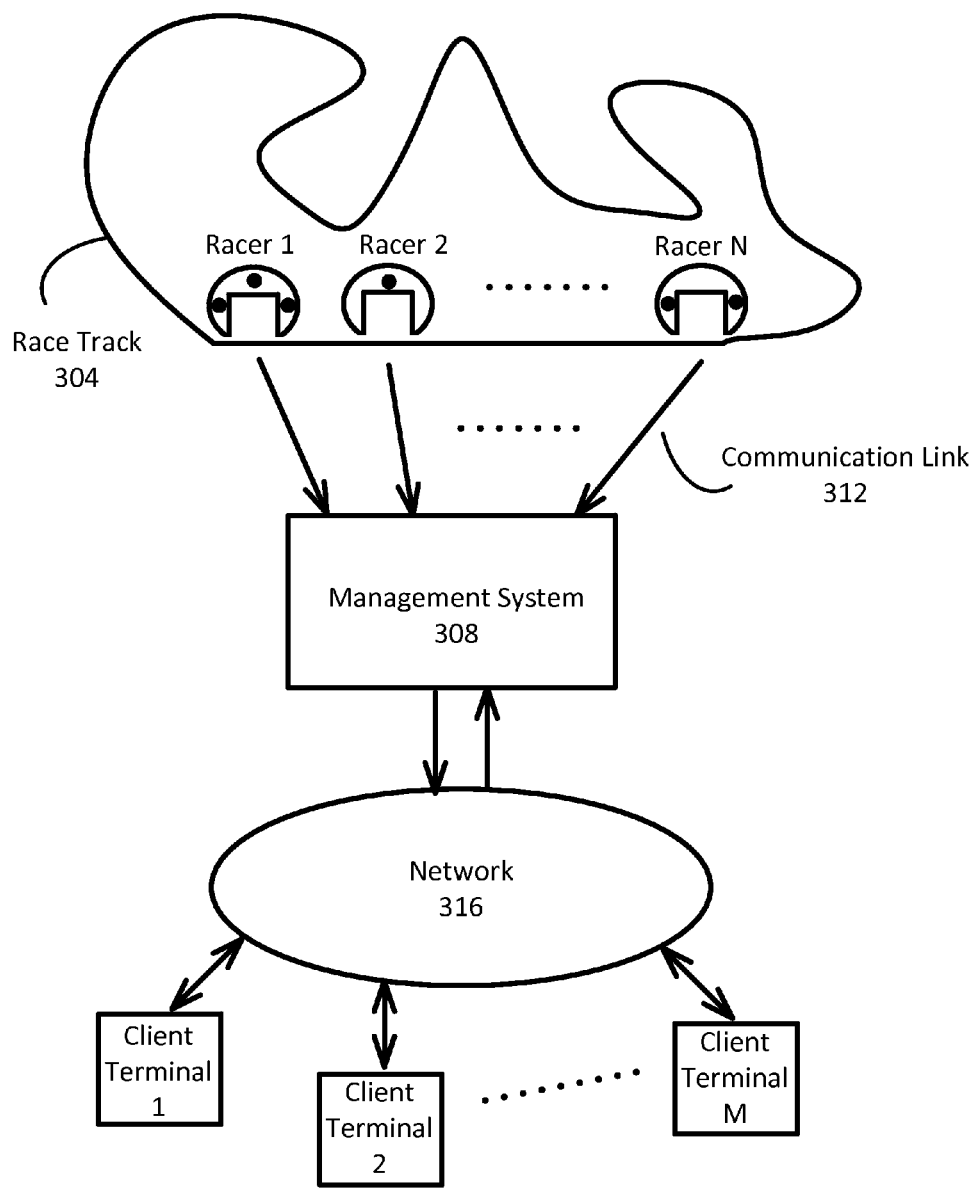
FIG. 3 illustrates an example of a system according to an embodiment for providing entertainment services by capturing images and sounds as perceived by a racer, and transmitting them to a user so that the user can virtually experience the race as if he/she is participating in the race.

FIG. 3 illustrates an example of a system according to an embodiment for providing entertainment services by capturing images and sounds as perceived by a racer, and transmitting them to a user so that the user can virtually experience the race as if he/she is participating in the race. Examples in this document are described in the context of the motor cycle racing. However, those skilled in the art recognize that applications can be made to any racing, involving cars, bicycles, boats, aircraft, horses, skis, skates, skateboards, sleighs, wheelchairs, yachts, and other vehicles or animals.

Referring to FIG. 3, a race track 304 is provided where multiple racers, racer 1, racer 2 . . . and racer N compete in the race. Each racer is equipped with one or more cameras and one or more microphones attached to his/her helmet, for example. In the example of FIG. 3, the racer 1 wears a helmet with three cameras, the racer 2 wears a helmet with one camera, and the racer N wears a helmet with two cameras, as represented by solid circles. The cameras and/or microphones may be attached to a racer's face directly or to a protecting gear other than a helmet. The number of cameras and the number of microphones carried by a racer may be any number according to predetermined needs for image and sound reception. As mentioned earlier, a device including both a camera and a microphone, or other sensing devices may be used. The images and sounds captured by the cameras, microphones or other devices are transmitted to a management system 308 through a communication link 312. The communication link 312 may represent a signal channel based on wireless communication protocols, satellite transmission protocols, or any other signal communication schemes.

The management system 308 may be located in a server and is configured to receive and process the signals including the images and sounds transmitted from the racers. The management system 308 is further configured to communicate with client terminals, 1, 2 ... and M through a network 316. The network may include the Internet, TV broadcasting network, satellite communication network, local area network (LAN), wide area network (WAN), personal area network (PAN), and other types of network. The client terminals may include cellular phones, smart phones, iPad®, tablets and other mobile devices or TV systems. Each client terminal has a screen and a speaker to reproduce the images and sounds that have been transmitted from a racer and processed by the management system 308.

Figure 4:
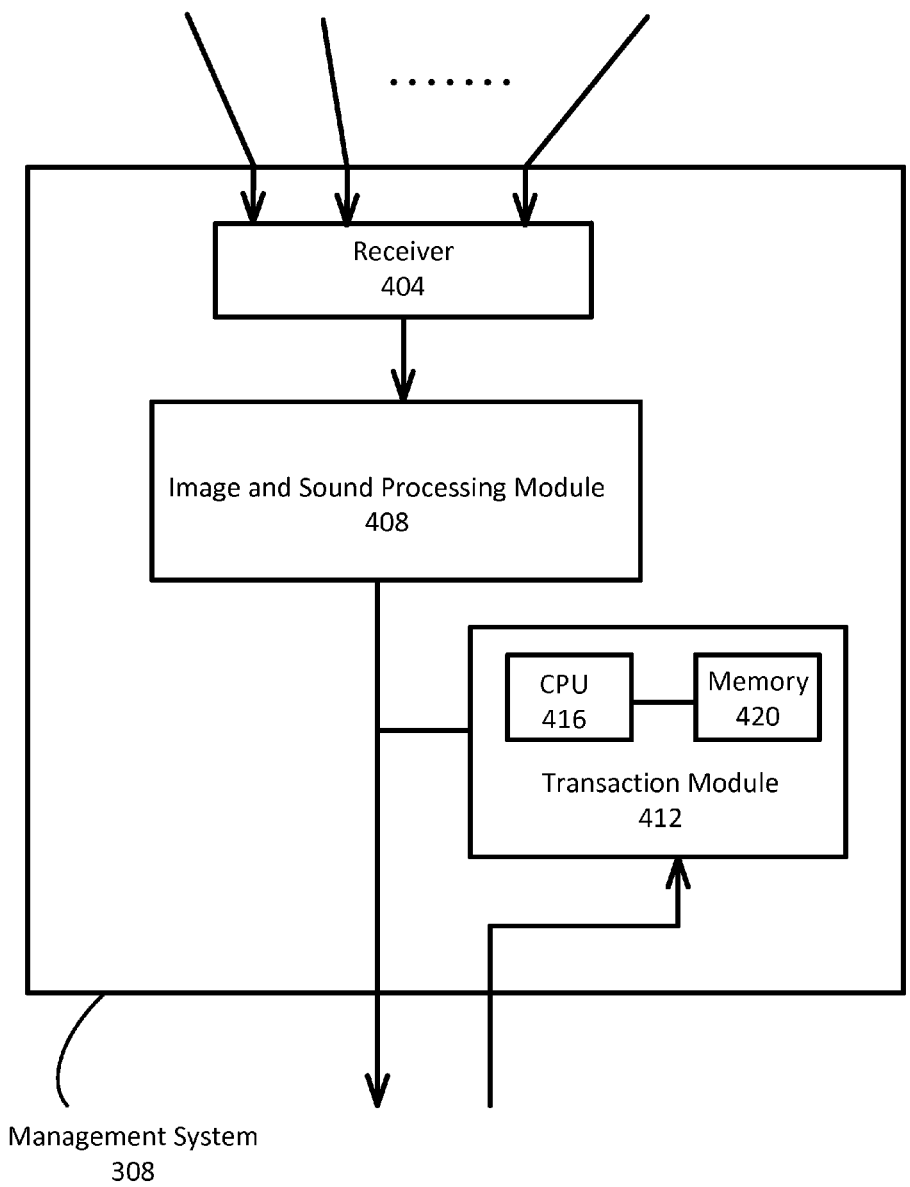
FIG. 4 is a block diagram illustrating the management system.

FIG. 4 is a block diagram illustrating the management system 308. The signals transmitted from the racers are received by a receiver 404. The receiver 404 may include an antenna and other components for analog-to-digital conversion, digital-to-analog conversion, power amplification, digital signal processing, etc. to receive the signals with high efficiency and fidelity. Any receiver technologies known to those skilled in the art can be utilized for the implementation of the receiver 404 as appropriate. The received signals are sent to an image and sound processing module 408, where the images and sounds are processed and prepared for transmission to the client terminals. For example, the images with different perspectives captured by two or more cameras of the racer may be processed for the user to experience the 3D effect. In another example, blurred or rapidly fluctuating images due to camera shaking may be corrected to be viewed without causing discomfort to the user. In yet another example, a loud noise, such as the roaring sound of the vehicle, may be reduced to a comfort level. In yet another example, the sounds from different audible perspectives captured by two or more microphones of the racer may be processed for the user to experience the stereophonic effect. Any image and sound processing technologies known to those skilled in the art can be utilized for the implementation of the image and sound processing module 408 as appropriate. The management system 308 further includes a transaction module 412, which may include a CPU 416 for controlling algorithms, electronic components and modules, information flow, etc. as well as a memory 420 for storing predetermined data and/or acquired data during the operation. The data can be updated as needed.

The transaction module 412 is configured to receive input information that the users input on the respective client terminals and thereafter transmitted through the network 316. A prompt page may be configured for the users to input necessary information. The input information pertains to the user, including an ID of the user, his/her choice of the payment method (credit card, PayPal®, money order, etc.), his/her credit card number if the credit card payment is chosen, and other account information. In addition to such account information, the user is asked which racer he/she wants to be connected to, so that the user can virtually share the common experience with his/her favorite racer through the images and sounds captured by the cameras and microphones placed in the proximity of the racer's eyes and ears. The received information may be stored in the memory 420 and updated when the user changes his/her account information, favorite racer to be connected to, or any other information pertaining to the user.

Upcoming events and schedules may be sent in advance by the transaction module 412 to the client terminals. The users may request to receive such event information via emails. Alternatively, such event information can be broadcast via audio/visual media. The schedule may list the names or IDs of the racers participating in each upcoming race so that each user can select the race to watch and the racer to get connected to. The connection fee may be a flat rate, for example, a few dollars, which can be set at lower than the fee to actually get a seat in the racing stadium. Prior to the race, the input information including the account information and the choice of a racer is obtained by the transaction module 412 from each user as inputted on the client terminal. Payment can be made using the payment method that the user specified as part of the account information. The transaction module 412 is configured to send the processed images and sounds, Corresponding to the racer of choice, to the client terminal of the user who chose the particular racer.

Figure 5:
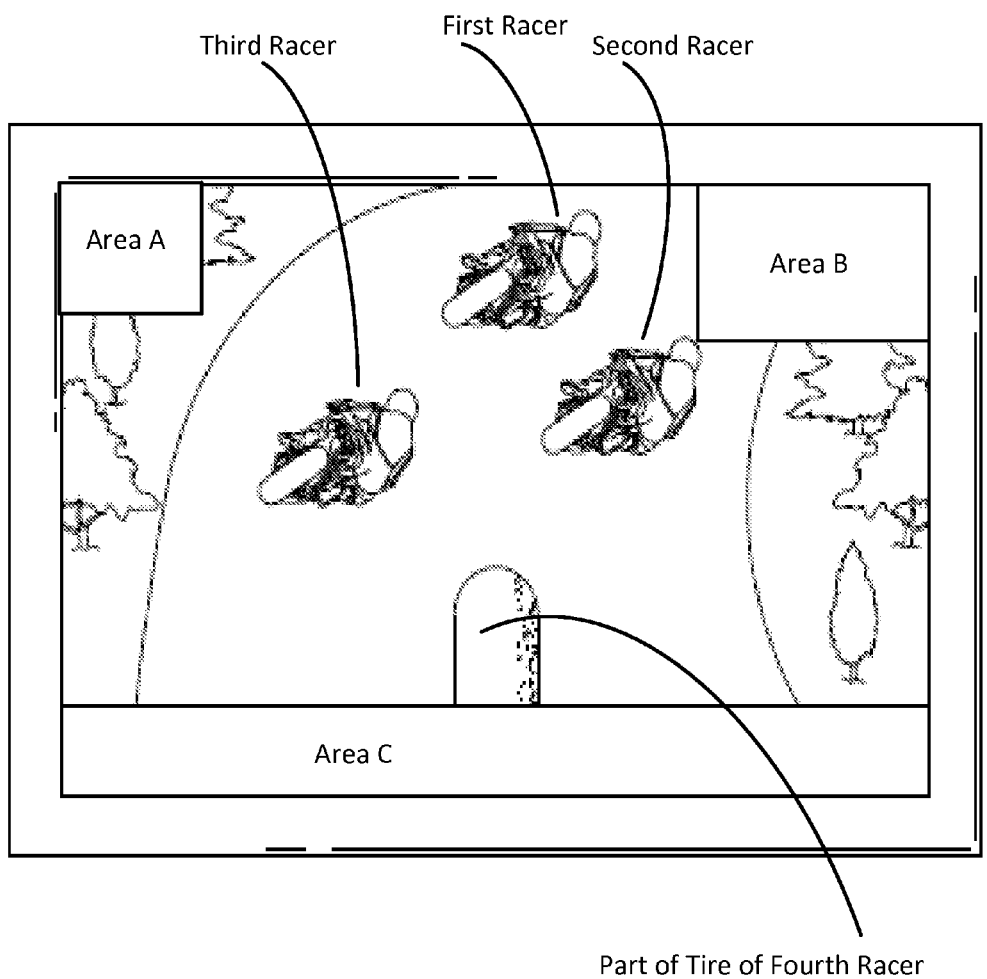
FIG. 5 illustrates an example of an image displayed on the client terminal.

FIG. 5 illustrates an example of an image displayed on the client terminal. The racer whom the user selected to get connection with is running No. 4, following three racers ahead of him/her who are turning along a sharp curve. The exciting moments are seized and experienced by the user. In addition to the racing scenes, advertisement can be shown in the lower area, at a corner or at the side of the screen as indicated by Area A, Area B or Area C. In exchange of advertisement fees from marketers or sponsors, these images or films advertising goods or services can be pre-stored in the memory 420 of the transaction module 412, and released for viewing at the same time when the images and sounds of the racing are outputted from the image and sound processing module 408. These areas may be used for other purposes. For example, one area may be used for showing TV broadcast scenes. This can be realized by contracting the TV broadcasting company in advance and obtaining the transmitted scenes through the communication link 312 of FIG. 3, for example, to the management system 308. In this way, the user can enjoy not only the scenes as captured by the racer of his/her choice but also the overall picture transmitted by the TV broadcast. In another example, one area may be used for showing the time, speed, laps, rank and other racing information associated with the racer, other racers and/or the race itself. Such racing information can be obtained from the company who organizes the race, for example, via a prior agreement or contract, and may be transmitted through the communication link 312 of FIG. 3, for example, to the management system 308 during the race.

Referring back to FIG. 4, the transaction module 412 of FIG. 4 is further configured to tally the number of users who selected each racer. According to the tally result (connection share) and the race result, points may be allocated to the users by the transaction module 412. For example, referring back to FIG. 1, suppose there are N=5 racers participating in the race, and there are M=10,000 users connected to watch the race. The transaction module 412 may tally to result that 4,000 users selected the racer 1, 3,000 users selected the racer 2, 2,000 users selected the racer 3, 500 users selected the racer 4, and 500 users selected the racer 5. Further suppose the racer 5 fished the race first, and the racer 1 finished the race second. Then, the transaction module 412 may be configured to give 20 points to each of the 500 users who selected the racer 5, and 2 points to each of the 4,000 users who selected the racer 1. Sponsors for the race or the advertisement may prepare goods or services that can be exchanged with a predetermined number of points. Thus, the users can experience additional entertainment by competing to accumulate the points to be redeemed, while the sponsors take advantage of the opportunity to promote their goods or services. For example, 100 points may be redeemed with a T-shirt having the logo of a motorcycle's manufacturer, 150 points may be redeemed with a pair of racer's gloves, 200 points may be redeemed with a dinner with the selected racer, etc. Furthermore, bonuses or awards may be given to the racers according to the connection share, providing the racers with an incentive to wear the cameras and microphones and cooperate in the virtual entertainment business.

The present system can be used for gambling as well. Gambling is regulated, and the regulations differ from country to country as well as from state to state in the U.S. In a conventional gambling, such as a horse racing, a gambler stakes money on a horse as a bet, and if it comes in first place, the bet is the winner. The winner gets money based on the pooled money and distribution rules. These transaction activities take place at a gambling station associated with the racetrack. In contrast, the present system can be configured to offer online gambling by allowing a user to bet on the racer of his/her choice. As explained earlier, prior to the race, the input information including the account information and the choice of a racer is obtained by the transaction module 412 from each user as inputted on the client terminal. A prompt page may be configured for the users to input necessary information. An option of playing the gamble may be shown on the prompt page, for example, so that the user can click the option button to choose to gamble. Upon choosing the option to gamble, the user is asked to enter age, residency and other personal information. The transaction module 412 receives the personal information, thereby determining if the user is permitted to gamble by looking up the national or state regulations that can be pre-stored in the memory 420, for example. Once all criteria are met to gamble, the user is allowed to play the gamble. The user may be prompted to bet money on the racer of his/her choice. The money may be withdrawn by using the payment method the user selected, for example, via credit card payment, PayPal, money order or other methods. After the race, the winner gets money based on distribution rules. The distribution rules may be predetermined based on the amount of the pooled money, the number of connections per racer (connection share) and the race result (which racer was the first, the second, and so on). Instead of money, points may be given to the users according to the distribution rules. Additionally, the winning money may be exchanged with points. The users can thus accumulate the points to redeem with the goods or services provided by the sponsors. These transaction activities can be controlled by the transaction module 412. The winning money may be paid to the credit card account of the winners, for example. Alternatively, the winning money can be pooled for betting for one or more of the subsequent races. Furthermore, the user may borrow money for betting. For example, prior to a race, the user may borrow a certain amount of money to enjoy betting and pay it back after the race. Alternatively, it may be arranged that the user can continue gambling for the subsequent races and postpone the payback, and the borrowed amount of money can be returned at the end of the series or any time during the series. If the user needs additional money during the series, he/she may be allowed to borrow more money even during the series. For example, suppose there are 16 races per season. The user may borrow $1,000 prior to the series of races. After betting 8 races, he/she spent all $1,000 for betting, but wishes to continue gambling. The user may be allowed to borrow additional $1,000 to bet for the subsequent 8 races and pay back $2,000 after the 16 races. However, the limit may be imposed according the credit limit, credit history and other conditions pertaining to the user. In addition, a certain percentage of the profit may be arranged for charities, donations or gifts for victims of natural disasters, refugees in war zones, etc. for the purpose of tax exemption as well as to improve perceptions of racing and/or gambling.

Figure 6:
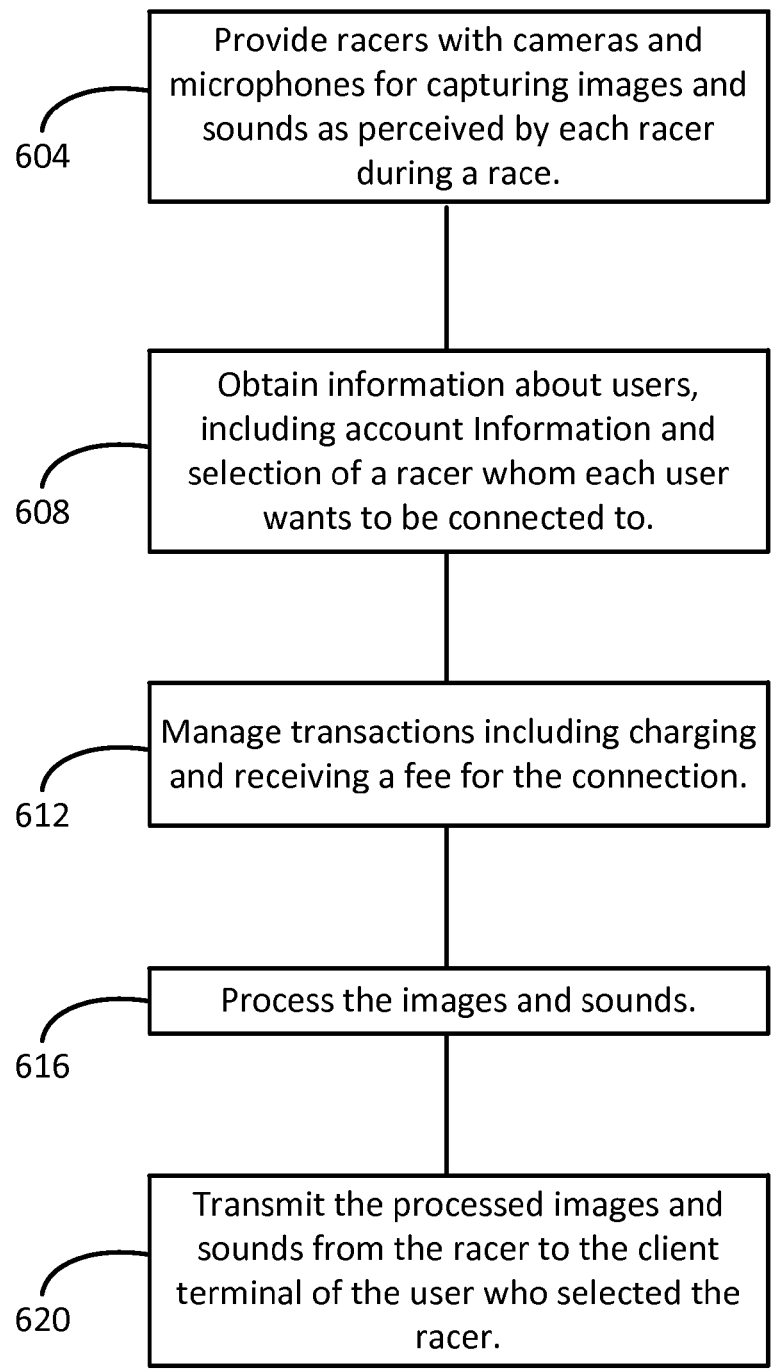
FIG. 6 illustrates a method of providing users with racing entertainment by transmitting images and sounds as perceived by a racer of the user's choice.

FIG. 6 illustrates a method of providing users with racing entertainment by transmitting images and sounds as perceived by a racer of the user's choice. Multiple racers participate in a race; and a large number of users can be entertained through the present system of FIG. 3 including the management system 308, network 316 and multiple client terminals that the users use, respectively. The order of steps in the flow charts illustrated in this document may not have to be the order that is shown. Some steps can be interchanged or sequenced differently depending on efficiency of operations, convenience of applications or any other scenarios. In step 604, each racer is provided with one or more cameras and one or more microphones that can be attached to the proximity of his/her eyes and ears. These devices may be attached to the face or head of the racer directly, his/her helmet or other protection gear. In step 608, information pertaining to each user is obtained, via, for example, a prompt page for inputting the information on a screen of the client terminal that the user is using. The input information includes account information, such as an ID of the user, his/her choice of the payment method (credit card, PayPal®, money order, etc.), his/her credit card number if the credit card payment is chosen, and the like. In addition, the input information includes which racer the user selects, so that the user can virtually share the common experience with his/her favorite racer through the images and sounds captured by the cameras and microphones placed in the proximity of the racer's eyes and ears. In step 612, the transaction is managed, including charging and receiving a fee for the connection between the user and the selected racer. The fee can be paid through the payment method that the user specified. In step 616, the images and sounds captured by the devices attached to each racer are processed by using the image and sound processing module 408 in FIG. 4. For example, the images with different perspectives captured by two or more cameras of the racer may be processed for the user to experience the 3D effect. In another example, blurred or rapidly fluctuating images due to camera shaking may be corrected to be viewed without causing discomfort to the user. In yet another example, a loud noise, such as the roaring sound of the vehicle, may be reduced to a comfort level. In yet another example, the sounds from different audible perspectives captured by two or more microphones of the racer may be processed for the user to experience the stereophonic effect. In step 620, the processed images and sounds from the racer are transmitted to the client terminal of the user who selected the racer.

Figure 7:
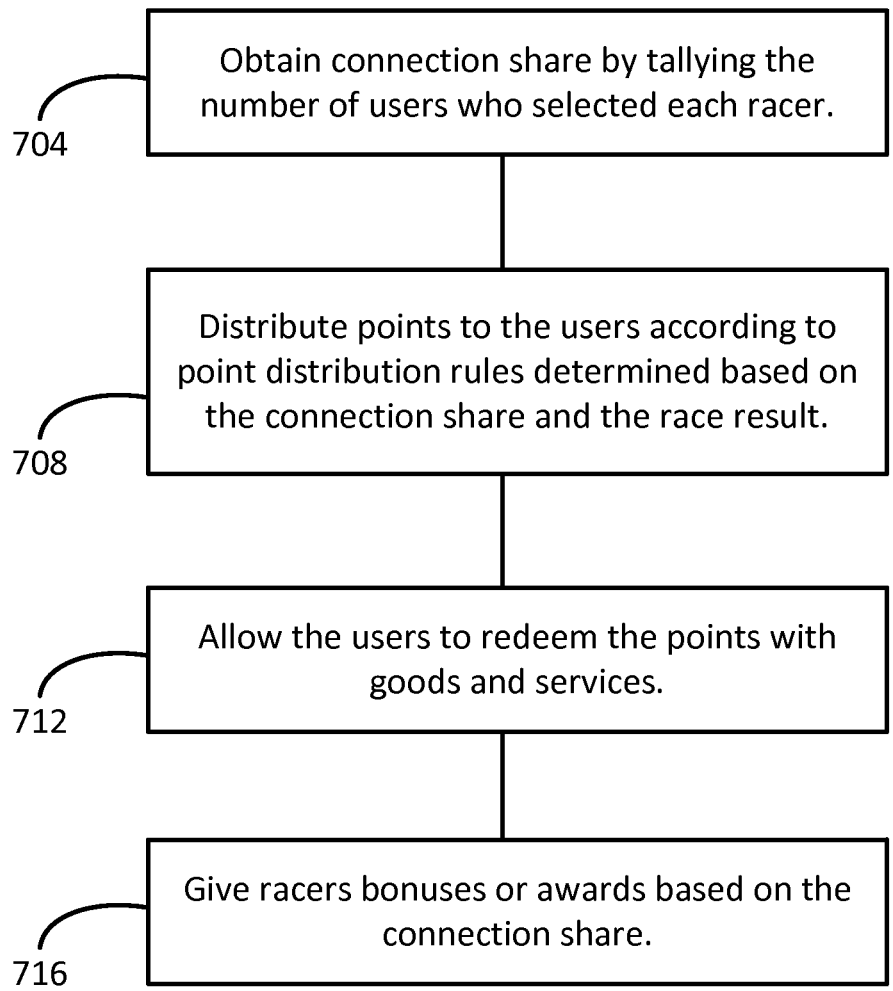
FIG. 7 illustrates an example of the transaction activity that can be conducted in addition to charging and receiving the fee.

In step 612 of the method illustrated in FIG. 6, the management of transactions includes charging and receiving the fee for the connection. This managing step can be modified or expanded to include other transactions. FIG. 7 illustrates an example of the transaction activity that can be conducted in addition to charging and receiving the fee in step 612 of FIG. 6. The steps shown in FIG. 7 can be added to the steps shown in FIG. 6 or other processes controlled by the present system, and the order of combined steps may be sequenced differently or some may be conducted in parallel. Based on the input information obtained in step 608 of FIG. 6, including the selection of a racer whom each user wants to be connected to, the connection share is obtained in step 704 by tallying the number of users who selected each racer. This step 704 may be conducted in parallel with, before or after step 612 of FIG. 6, where the connection fee is charged and received. After the race, such as after step 620 of FIG. 6, points may be distributed to the users in step 708. The point distribution rules may be predetermined based on the connection share and the race result. For example, referring back to FIG. 1, suppose there are N=5 racers participating in the race, and there are M=10, 000 users connected to watch the race. The connection share can be obtained in step 704 based on the tally result giving that 4,000 users selected the racer 1, 3,000 users selected the racer 2, 2,000 users selected the racer 3, 500 users selected the racer 4, and 500 users selected the racer 5. Further suppose the racer 5 fished the race first, and the racer 1 finished the race second. Then, the points to the users may be distributed in step 708 according to the point distribution rules to give 20 points to each of the 500 users who selected the racer 5, 2 points to each of the 4,000 users who selected the racer 1, and 0 points to the other users. Sponsors for the race or the advertisement may prepare goods or services that can be exchanged with a predetermined number of points. The users are allowed to accumulate points from multiple races and to redeem the points with the goods or services in step 712. Using this point system, the sponsors can take advantage of the opportunity to promote their goods or services. For example, 100 points may be redeemed with a T-shirt having the logo of a motorcycle's manufacturer, 150 points may be redeemed with a pair of racer's gloves, 200 points may be redeemed with a dinner with the selected racer, etc. Furthermore, bonuses or awards are given to the racers according to the connection share in step 716, providing the racers with an incentive to wear the cameras and microphones and cooperate in the virtual entertainment business.

Figure 8:
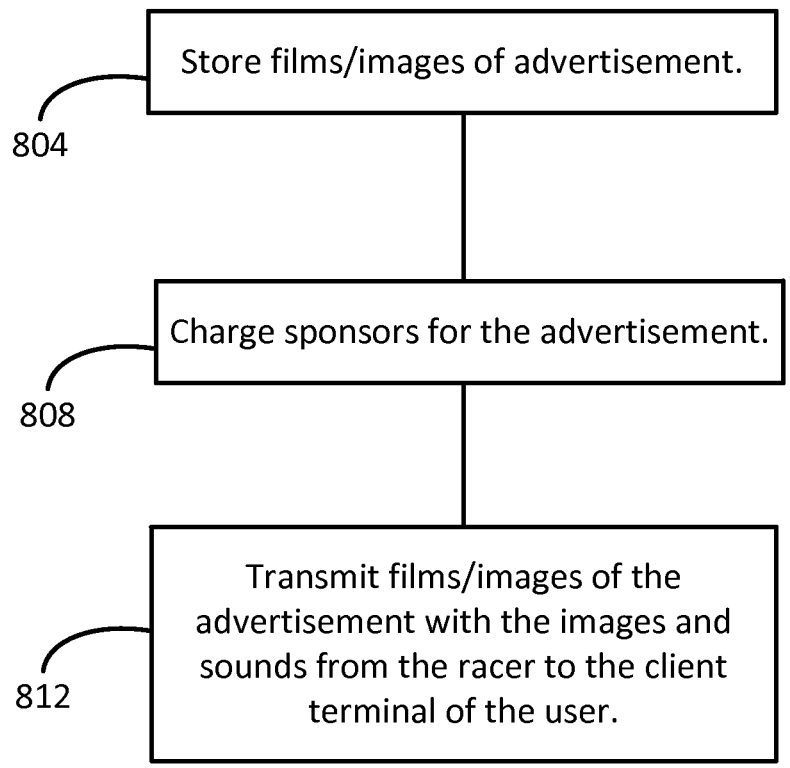
FIG. 8 illustrates another example of the transaction activity that can be conducted in addition to charging and receiving the fee.

FIG. 8 illustrates another example of the transaction activity that can be conducted in addition to charging and receiving the fee in step 612 of FIG. 6. The steps shown in FIG. 8 can be added to the steps shown in FIG. 6, to the combined steps shown in FIGS. 6 and 7 or other processes controlled by the present system, and the order of combined steps may be sequenced differently or some may be conducted in parallel. Sponsors for the race, sponsors for the goods or services redeemable in the point system, or other marketers may want to show advertisement to the users watching the race. The films or images showing such advertisement may be prepared by the sponsors, and stored in the memory 420 of the present system in step 804. The sponsors are charged for the advertisement in step 808. In step 812, these films or images of the advertisement may be combined with the images and sounds from the racer and transmitted to the client terminal of the user who selected the racer in step 812. The combination of the race and the advertisement may be displayed, as shown in the example of FIG. 5, on the screen of the client terminal.

Figure 9:
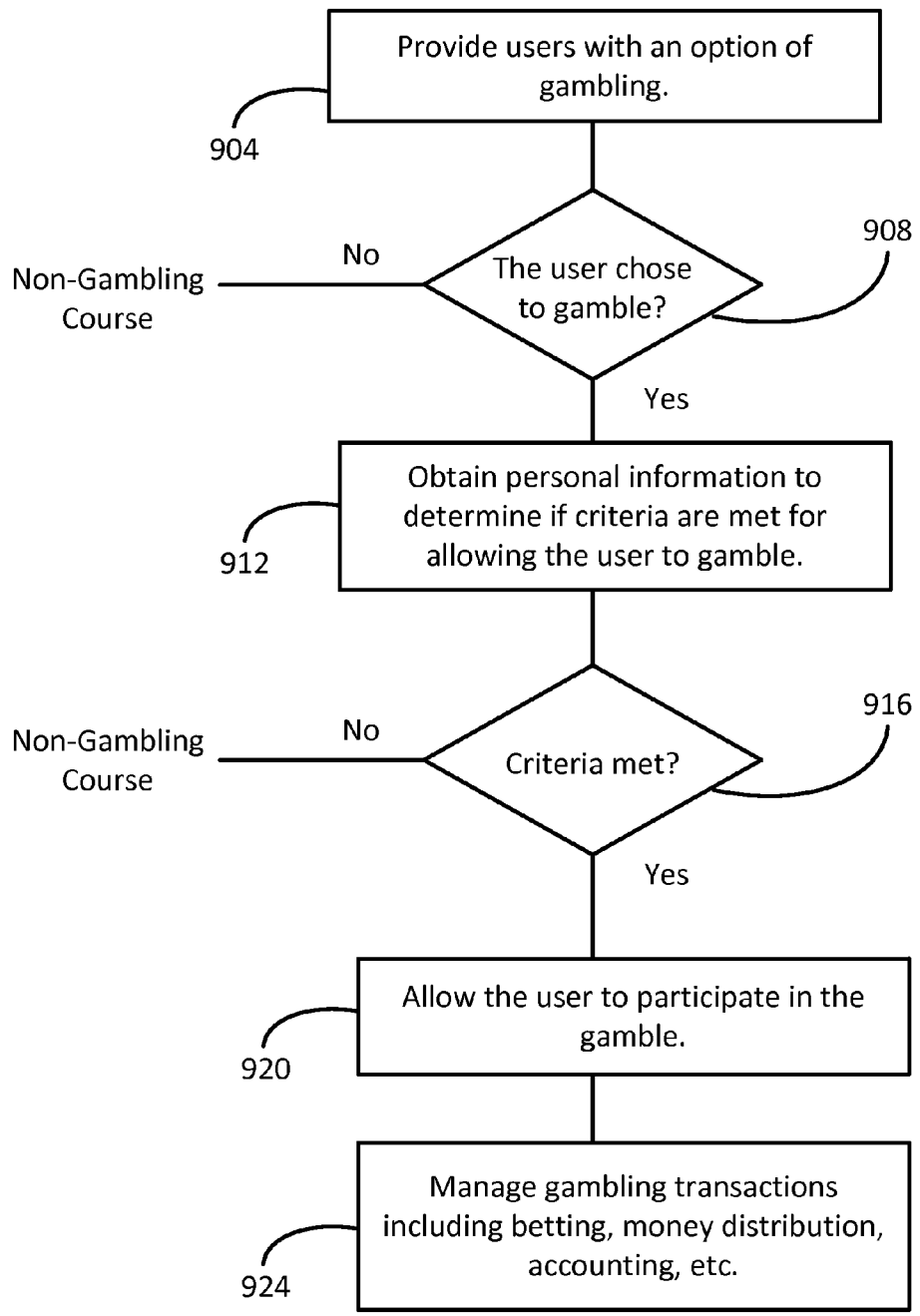
FIG. 9 illustrates an example of providing gambling that can be conducted in addition to charging and receiving the fee.

FIG. 9 illustrates an example of providing gambling that can be conducted in addition to charging and receiving the fee in step 612 of FIG. 6. The steps shown in FIG. 9 can be added to the steps shown in FIG. 6, to the combined steps shown in FIGS. 6 and 7, FIGS. 6 and 8, or FIGS. 6, 7 and 8, or other processes controlled by the present system. The order of combined steps may be sequenced differently or some may be conducted in parallel. In step 904, the users are provided with an option of gambling. Such an option may be shown in the prompt page on the client terminal, for example, so that the user can click the option button to choose to gamble. Upon choosing the option to gamble in step 908, the user is asked to enter age, residency and other personal information. Such personal information is obtained in step 912 to determine if the user is permitted to gamble by looking up the national or state regulations that can be pre-stored in the memory 420, for example. If the user chose not to pursue gambling in step 908, the process proceeds to the non-gambling course, such as to step 608 of FIG. 6, step 704 of FIG. 7, or step 812 of FIG. 8, for example. In step 916, it is determined if the criteria to play the gamble are not met based on the personal information of the user compared to the regulations, the user is denied to play the gamble and the process proceeds to the non-gambling course. If it is decided in step 916 that the criteria are met for the user to play the gamble, the user is allowed to participate in the gamble in step 920. There are in general many ways to gamble. Various transaction activities associated gambling, such as betting, money distribution, accounting, etc. are managed in step 924.

For example, in step 924, the user may be prompted to bet money on the racer of his/her choice. It can be configured that the racer whom the user wants to get connected to is the racer on whom the user bets money. The money may be withdrawn by using the payment method the user specified, for example, via credit card payment, PayPal, money order or other methods. After the race, the winner gets money based on distribution rules. The distribution rules may be predetermined based on the amount of the pooled-money, the number of connections per racer (connection share) and the race result (which racer was the first, the second, and so on). Instead of money, points may be given to the users according to the distribution rules. Additionally, the winning money may be exchanged with points. The users can thus accumulate the points to redeem with the goods or services provided by the sponsors. These transaction activities can be controlled by the transaction module 412. The winning money may be paid to the credit card account of the winners, for example. Alternatively, the winning money can be pooled for betting for one or more of the subsequent races. Furthermore, the user may be allowed to borrow money for betting from the pooled money. For example, prior to a race, the user may borrow a certain amount of money to enjoy betting and pay it back after the race. Alternatively, it may be arranged that the user can continue gambling until the end of the series of races, and the borrowed amount of money can be returned to the pool at the end of the series. If the better needs additional money during the series, he/she may be allowed to borrow more money even during the series. However, the limit may be imposed according the credit limit, credit history, and other conditions pertaining to the user. In addition, a certain percentage of the profit may be arranged for charities, donations or gifts for victims of natural disasters, refugees in war zones, etc. for the purpose of tax exemption as well as to improve perceptions of racing and/or gambling.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:
1. A method of providing racing entertainment comprising:
   providing each of a plurality of racers with one or more cameras and. one or more microphones to capture images and sounds as perceived by the racer during a race;
   obtaining information pertaining to each of a plurality of users, including account information and selection of a racer whom the user wants to get connection with;

managing transactions;
processing the images and sounds; and
transmitting the processed images and sounds from the racer to a client terminal of the user who selected the racer,
wherein the managing transactions comprises:
calculating the number of users who selected each racer to obtain connection share;
distributing points to the plurality of users according to point distribution rules predetermined based on the connection share and a race result;
allowing the plurality of users to redeem the points with goods or services; and
giving bonuses or awards to the plurality of racers based on the connection share.

2. The method of claim 1, wherein
the managing transactions comprises:
charging each of the plurality of users a fee for the connection to the selected racer to receive the processed images and sounds from the selected racer; and
receiving the fee based on the account information obtained from the user.

3. The method of claim 1, wherein
the managing transactions comprises:
storing films or images of advertisement prepared by sponsors; and
charging the sponsors a fee for the advertisement, and wherein
the transmitting comprises transmitting the films or images of the advertisement with the processed images and sounds from the racer to a client terminal of the user who selected the racer.

4. The method of claim 1. wherein
the transmitting comprises transmitting TV broadcast scenes of the race with the processed images and sounds from the racer to a client terminal of the user who selected the racer.

5. The method of claim 1, wherein
the transmitting comprises transmitting racing information with the processed images and sounds from the racer to a client terminal of the user who selected the racer.

6. The method of claim 5, wherein
the racing information includes one or more of time, speed, laps and rank associated with the racer or other racers.

7. The method of claim 1, wherein
the managing transactions comprises:
providing the plurality of users with an option of gambling;
obtaining personal information pertaining to each of the users who chose the option of gambling;
determining if criteria are met for allowing the user to gamble based on the personal information compared to regulations;
allowing the user to participate in gambling if the criteria are met for the user; and
managing, transactions associated with gambling.

8. The method of claim 7, wherein
the managing transactions associated with gambling comprises:
managing betting;
obtaining betting money from the users based on the account information, and
distributing points or winning money to winning users based on distribution rules.

9. The method of claim 8, wherein
the distribution rules are predetermined based on an amount of pooled money, connection share and a race result.

10. The method of claim 8, wherein
the managing transactions associated with gambling further comprises:
allowing the winning users to pool the winning money to bet for one or more subsequent races.

11. The method of claim 8, wherein
the managing transactions associated with gambling further comprises:
allowing the users to borrow money to bet for one or more races and pay the money back later.

12. A system comprising:
a receiver for receiving images and sounds captured by one or more cameras and one or more microphones, respectively, which are attached to each of a plurality of racers in a race;
an image and sound processing module for processing the received, images and sounds; and
a transaction module configured to obtain information pertaining to each of a plurality of users, including account information and selection of a racer whom the user wants to get connection with, and to transmit the processed images and sounds from the racer to a client terminal of the user who selected the racer,
wherein the transaction module is further configured to perform operations comprising:
calculating the number of users who selected each racer to obtain connection share;
distributing points to the plurality of users according to point distribution rules predetermined based on the connection share and a race result;
allowing the plurality of users to redeem the points with goods or services; and
giving bonuses or awards to the plurality of racers based on the connection share.

13. The system of clam 12, wherein
the transaction module is further configured to perform operations comprising:
charging each of the plurality of users a fee for the connection to the selected racer to receive the processed images and sounds from the selected racer; and
receiving the fee based on the account information obtained from the user, 14. The system of claim 12, wherein
the transaction module is further configured to perform operations comprising:
storing films or images of advertisement prepared by sponsors
charging the sponsors a fee for the advertisement; and
transmitting the films or images of the advertisement with the processed images and sounds from the racer to a client terminal of the user who selected the racer.

15. The system of claim 12, wherein
the transaction module is further configured to perform operations comprising:
transmitting TV broadcast scenes of the race with the processed images and sounds from the racer to a client terminal of the user who selected the racer.

16. The system of claim 12, wherein
the transaction module is further configured to perform operations comprising:
transmitting racing information with the processed images and sounds from the racer to a client terminal of the user who selected the racer.

17. The system of claim 12, wherein
the transaction module is further configured to perform operations comprising:
   providing the plurality of users with an option of gambling;
   obtaining personal information pertaining to each of the users who chose the option of gambling;
   determining if criteria are met for allowing the user to gamble based on the personal information compared to regulations;
   allowing the user to participate in gambling if the criteria are net for the user; and
   managing transactions associated with gambling.

* * * * *